United States Patent [19]

Scribner et al.

[11] Patent Number: 5,205,995
[45] Date of Patent: Apr. 27, 1993

[54] METATHESIS OF ACIDIC BY-PRODUCT OF CHLORINE DIOXIDE GENERATING APPARATUS

[75] Inventors: Herbert C. Scribner, Monroe, La.; Maurice C. J. Fredette, Mississauga; Edward J. Bechberger, Etobicoke, both of Canada

[73] Assignee: Sterling Canada Inc., Islington, Canada

[21] Appl. No.: 844,231

[22] Filed: Mar. 2, 1992

Related U.S. Application Data

[62] Division of Ser. No. 688,438, Apr. 22, 1991, Pat. No. 5,116,595.

[51] Int. Cl.$^5$ ............................................. B01J 8/04
[52] U.S. Cl. ................................... 422/189; 422/234; 422/267; 422/281; 423/477; 423/478; 423/522
[58] Field of Search ............... 422/189, 267, 281, 234; 423/478, 551, 552, 643, 477, 522

[56] References Cited

U.S. PATENT DOCUMENTS

| | | | |
|---|---|---|---|
| 2,193,092 | 3/1940 | Frick et al. | 423/643 |
| 3,789,108 | 1/1974 | Rapson | 423/478 |
| 3,793,439 | 2/1974 | Rapson | 423/478 |
| 3,864,456 | 2/1975 | Winfield et al. | 423/478 |
| 3,975,505 | 8/1976 | Fuller | 423/478 |
| 4,075,308 | 2/1978 | Rapson et al. | 423/478 |
| 4,081,520 | 3/1978 | Swindells et al. | 423/478 |
| 4,104,365 | 8/1978 | Howard et al. | 423/478 |
| 4,216,195 | 8/1980 | Jaszka et al. | 423/478 |
| 4,290,998 | 9/1981 | Dick et al. | 422/193 |
| 4,325,934 | 4/1982 | Swindells et al. | 423/478 |
| 4,806,215 | 2/1989 | Twardowski | 204/98 |
| 4,938,943 | 7/1990 | Norell et al. | 423/478 |
| 4,961,918 | 10/1990 | Norell et al. | 423/479 |
| 4,978,517 | 12/1990 | Norell et al. | 423/479 |
| 5,066,477 | 11/1991 | Zell et al. | 423/479 |

FOREIGN PATENT DOCUMENTS

| | | | |
|---|---|---|---|
| 956784 | 10/1974 | Canada | 423/477 |
| 1118184 | 2/1982 | Canada . | |
| 2490206 | 3/1982 | France | 423/478 |

Primary Examiner—Robert J. Warden
Assistant Examiner—Christopher Y. Kim
Attorney, Agent, or Firm—Sim & McBurney

[57] ABSTRACT

Sodium sesquisulfate produced in crystalline form in a high acidity methanol-based highly efficient chlorine dioxide generating process is converted by metathesis to crystalline anhydrous neutral sodium sulfate and the acid recovered as a result is recycled to the chlorine dioxide generating step. The metathesis is effected by contacting the crystalline sodium sesquisulfate with aqueous sodium chlorate solution, aqueous sodium chloride solution, aqueous methanol or water alone. The metathesis is effected in such manner as to minimize the additional evaporative load imposed on the chlorine dioxide generating process by the metathesis medium.

1 Claim, 3 Drawing Sheets

METATHESIS OF ACIDIC BY-PRODUCT OF CHLORINE DIOXIDE GENERATING APPARATUS

This application is a divisional of copending U.S. patent application Ser. No. 688,438 filed Apr. 22, 1991 now U.S. Pat. No. 5,116,595, issued May 26, 1992.

FIELD OF INVENTION

The present invention relates to the product on of chlorine dioxide and the processing of acidic by-products of such production.

BACKGROUND TO THE INVENTION

In U.S. Pat. No. 4,081,520, assigned to the assignee hereof and the disclosure of which is incorporated herein by reference, there is described a process for the production of chlorine dioxide at high efficiency using sodium chlorate, sulfuric acid and methanol. The reaction medium from which the chlorine dioxide is formed is maintained at its boiling point, generally in the range of about 50° to about 85° C., under a subatmospheric pressure. The evaporated water serves to dilute the chlorine dioxide for removal from the reaction zone.

The mechanism of reaction is thought to be that chlorine, coproduced with the chlorine dioxide, is reduced by the methanol to chloride ions, which then react with the sodium chlorate. The reaction medium generally has a total acid normality greater than about 4.5 normal, which results in the formation of a sodium acid sulfate, usually sodium sesquisulfate, which precipitates from the reaction medium, after becoming saturated with the salt following start-up. The process equation may be represented as:

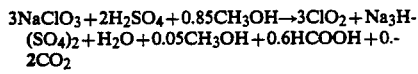

$$3NaClO_3 + 2H_2SO_4 + 0.85CH_3OH \rightarrow 3ClO_2 + Na_3H(SO_4)_2 + H_2O + 0.05CH_3OH + 0.6HCOOH + 0.2CO_2$$

This process is highly efficient in terms of the conversion of chlorate ions to chlorine dioxide and efficiencies well in excess of 90% can be achieved. The chlorine dioxide which results is virtually uncontaminated by chlorine, which is highly beneficial in the modern pulp mill environment. The process described in U.S. Pat. No. 4,081,520 has been widely adopted commercially and is known as the "R8" process.

As noted above, the by-product of this process is a sodium acid sulfate. This material may be used, as is, in the pulp mill as a make-up chemical for sulfur values lost from the mill. However, with the considerable tightening of the pulp mill environment in recent years, such sulfur losses have been significantly decreased, so that the requirement for make-up sodium sulfate also has declined to the stage where the material is an unwanted by-product.

Owing to the acidic nature of the by-product, sodium sesquisulfate cannot readily be disposed of in that form, requiring neutralization of the acid values prior to disposal. With the trend towards higher chlorine dioxide substitution for chlorine in many mills, the necessity to neutralize increasing quantities of sodium sesquisulfate may result in an imbalance of caustic and chlorine within the mill. The caustic demand increases while chlorine usage declines, resulting in increased costs to the mills. In addition, the lost acid values of the sodium sesquisulfate require that make-up sulfuric acid must be fed continuously to the chlorine dioxide generator to maintain the required acidity.

There have been prior suggestions to alleviate this problem in the R8 process and also in other chlorine dioxide generating processes which produce an acid sulfate by-product. For example, in U.S. Pat. No. 3,975,505 there is described the conversion of acid sulfate produced in a high acidity process for generating chlorine dioxide from sodium chlorate, sodium chloride and sulfuric acid, by passing crystalline by-product from the chlorine dioxide generator countercurrent to warm wash water in a washing column, which has the effect of not only freeing the crystalline material of entrained reaction medium but also converting the sodium acid sulfate to neutral sodium sulfate.

U.S. Pat. No. 4,325,934, assigned to the assignee hereof, describes contacting the solid phase by-product sodium acid sulfate from an R8 chlorine dioxide generator with a mixture of water and methanol to produce solid phase neutral sodium sulfate. This prior art reference describes the preferred use of weight ratios of water to sodium acid sulfate (calculated as $Na_3H(SO_4)_2$) of about 0.6:1 to about 0.8:1 and of methanol to sodium acid sulfate (calculated as $Na_3H(SO_4)_2$) of about 0.3:1 to about 0.8:1. Acid values recovered by this process are recycled to the chlorine dioxide generator, while excess methanol is stripped from the acidic solution.

Canadian Pat. No. 1,118,184 granted to the assignee hereof, describes a procedure in which the solid phase by-product from the R8 process is contacted with warm water to effect conversion of by-product sodium sesquisulfate to neutral sodium sulfate in a multi-stage decantation-washing operation.

None of these procedures has proved to be commercially attractive, for a variety of reasons. The procedure described in U.S. Pat. No. 3,975,505 refers to a different process for forming chlorine dioxide as well as significantly increasing the evaporative load on the generator, U.S. Pat. No. 4,325,934 requires a costly stripping operation with respect to the excess of methanol employed and the equipment described in Canadian Pat. No. 1,118,184 has been found to plug frequently and to add approximately three to four tonnes of water per tonne of chlorine dioxide generated to the evaporative load of the generator.

SUMMARY OF INVENTION

The present invention provides an improved procedure to effect metathesis of solid phase sodium sesquisulfate from an R8 chlorine dioxide generating process to recover acid values therefrom for reuse in the chlorine dioxide generating process and to convert the sodium sesquisulfate to neutral anhydrous sodium sulfate, while, at the same time, avoiding significantly increasing the evaporative load on the chlorine dioxide generator and avoiding the necessity to strip off excess methanol. In this way, the problems of the prior art procedures described above are overcome by the present invention.

In one aspect of the invention, there is provided a process for the conversion of sodium sesquisulfate to neutral anhydrous sodium sulfate, which comprises contacting the sodium sesquisulfate in solid crystalline form with an aqueous medium for a time and at a temperature at least sufficient to effect conversion of the solid crystalline sodium sesquisulfate to neutral anhydrous sodium sulfate at least partially in solid crystalline form and to form an aqueous acid-containing medium having a total acid normality of up to about 4.8 normal.

Accordingly, in the present invention, an aqueous medium is employed to effect metathesis of the sodium sesquisulfate to neutral anhydrous sodium sulfate. The sulfuric acid solution which results may be forwarded to the chlorine dioxide generator producing the sodium sesquisulfate to provide acid values thereto.

The present invention comprises three embodiments of metathesis procedure, involving the use of water alone, the use of aqueous solutions of sodium chlorate and the use of aqueous solutions of methanol. In each embodiment, the process conditions utilized result in an increased evaporative load on the chlorine dioxide generator, generally no more than about 2 tonnes of water per tonne of chlorine dioxide generated, hence overcoming the problem of the significantly increased evaporative load imposed by the column-type metathesis equipment described in the aforementioned U.S. Pat. No. 3,975,505 and Canadian Pat. No. 1,118,184.

In each of the embodiments of the present invention, there is employed a metathesis procedure in which sodium sesquisulfate removed from a chlorine dioxide generator with entrained aqueous acid reaction medium is filtered and washed free from such entrained medium, the resulting solid phase sodium sesquisulphate is contacted with the metathesis medium in one or more stirred tanks, and the resulting slurry of neutral anhydrous sodium sulfate is filtered to recover the solid phase. The acid values contained in the filtrate then may be used in the chlorine dioxide generating process which produced the sodium acid sulfate.

In a first aspect of the present invention, therefore, there is provided a process for the conversion of sodium sesquisulfate to neutral anhydrous sodium sulfate, which comprises contacting the sodium sesquisulfate in solid crystalline form with an aqueous medium containing from about 0.01 to about 7 molar sodium chlorate for a time and at a temperature at least sufficient to effect conversion of the solid crystalline sodium sesquisulfate to neutral anhydrous sodium sulfate at least partially in solid crystalline form and to form an aqueous acid-containing medium having a total acid normality of up to about 4.8 normal. This first aspect of the invention, therefore, relates to the employment of an aqueous solution of sodium chlorate as the metathesis medium.

In this aspect of the present invention, the sodium chlorate solution may be replaced by another sodium salt to provide the common ion effect achieved thereby, such as sodium chloride. In this latter embodiment, the aqueous medium contacting the crystalline sodium sesquisulfate containing from about 0.01 to about 5 molar sodium chloride, preferably about 2 to about 4 molar sodium chloride.

In a second aspect of the present invention, there is provided a process for the conversion of sodium sesquisulfate to neutral anhydrous sodium sulfate, which comprises contacting the sodium sesquisulfate in solid crystalline form with an aqueous medium containing up to about 0.15 tonnes of methanol per tonne of chlorine dioxide produced for a time and at a temperature at least sufficient to effect conversion of the solid crystalline sodium sesquisulfate to neutral anhydrous sodium sulfate at least partially in solid crystalline form and to form an aqueous acid-containing medium having a total acid normality of up to about 4.8 normal. This second aspect of the invention, therefore, relates to the employment of an aqueous solution of methanol as the metathesis medium.

In a third aspect of the present invention, there is provided a process for the conversion of a slurry of sodium sesquisulfate having entrained reaction medium from a chlorine dioxide generating process associated therewith to neutral anhydrous sodium sulfate, which comprises feeding the slurry to a first filter means wherein solid crystalline sodium sesquisulfate is separated from entrained reaction medium and is contacted with wash water to remove residual entrained reaction medium, contacting the separated solid crystalline sodium sesquisulfate with water in a mixing tank for a time and at a temperature at least sufficient to effect conversion of the solid crystalline sodium sesquisulfate to neutral anhydrous sodium sulfate at least partially in solid crystalline form and to form an aqueous acid-containing medium having a total acid normality of up to about 4.8 normal, separating the solid phase crystalline neutral anhydrous sodium sulfate from the aqueous acid-containing medium by filtration on a second filter means, and recycling part of the aqueous acid medium to the first filter means to constitute the wash water used therein. In instances which the acid aqueous medium can be utilized in the pulp mill other than as a recycle medium to the chlorine dioxide generator, the recycle step of part of the aqueous acid medium to the first filter means to constitute the wash water therein may be omitted, and still maintain a satisfactory water balance. This third aspect of the invention, therefore, relates to the employment of water alone as the metathesis medium.

In another aspect of the present invention, there is provided a process for the production of chlorine dioxide, which comprises reacting chlorate ions and methanol in an aqueous acid reaction medium having a total acid normality of at least about 4 normal and containing sulfuric acid to form chlorine dioxide in a reaction zone from the aqueous acid reaction medium; maintaining the aqueous acid reaction medium at its boiling point under a subatmospheric pressure applied to the reaction zone and precipitating a by-product acid sulfate in the reaction zone from the aqueous reaction medium; removing the precipitated by-product acid sulfate from the reaction zone; contacting the removed by-product acid sulfate in the solid phase with an aqueous medium selected from the group consisting of water, aqueous sodium chlorate solution, aqueous sodium chloride solution and aqueous methanol solution in accordance with the procedures of the three aspects of the invention described above to effect conversion of the solid phase by-product acid sulfate into solid phase neutral anhydrous sulfate and to form an aqueous acid medium having a total acid normality up to about 4.8 normal; separating the solid phase neutral anhydrous sulfate from the aqueous acid medium; and, optionally, recycling the aqueous acid medium to the reaction zone.

Essential to the present invention is conversion of crystalline sodium sesquisulfate, or other acid sulfate, produced by a high acidity methanol-based chlorine dioxide generating process effected in a single vessel generator-evaporator-crystallizer, to solid phase neutral anhydrous form to recover acid values from the sodium sesquisulfate for reutilization in the chlorine dioxide generating process.

The metathesis of sodium sesquisulfate may be represented by the following general equation:

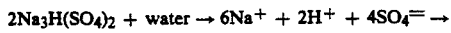

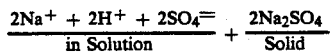

The reaction is driven by precipitation of less soluble Na$_2$SO$_4$, which removes Na$^+$ and SO$_4^=$ ions from solution and permits more sodium sesquisulfate to dissolve. In the embodiment where aqueous sodium chlorate or sodium chloride is used, additional Na$^+$ ions from the NaClO$_3$ or NaCl depresses the Na$_2$SO$_4$ solubility. Similarly, in the embodiment where aqueous methanol is used, the presence of the methanol depresses Na$_2$SO$_4$ solubility.

It is advantageous to employ solutions of sodium chlorate to effect the metathesis in comparison to water alone, since the common sodium ion depresses the solubility of neutral anhydrous sodium sulfate, thereby increasing the yield of this product. In addition, the same water is used for conveying sodium chlorate to the generator and to effect metathesis, thereby maintaining the additional evaporative load on the generator below about 1 tonne per tonne of chlorine dioxide.

Similarly, it is advantageous to employ solutions of sodium chloride to effect metathesis in comparison to water alone, since an increased yield of anhydrous sodium sulfate results from the common ion effect. In this embodiment, the acidified aqueous phase by-product from such metathesis is useful for pH control in the bleach plant of the pulp mill and is not normally recycled to the chlorine dioxide generator.

The by-product neutral sodium sulfate produced by the process of the invention may be employed to make-up pulp mill sulfur losses. Some or all of the sodium sulfate also may be used in the electrochemical acidification process described in copending U.S. patent application Ser. No. 535,165 (E437), assigned to the assignee hereof and the disclosure of which is incorporated herein by reference.

Such acidification can be achieved, for example, in an electrolytic process involving a two-compartment cell equipped with a cation-exchange membrane separating the anodic compartment, where the acidification takes place, from the cathodic compartment, where hydroxyl ions are produced. Alternatively, a three-compartment cell equipped with two cation-exchange membranes can be used whereby a neutral sulfate solution is circulated in the center compartment and/or is employed for the preparation of the anolyte.

Another possibility is to employ an electrodialytic process utilizing bipolar membranes in which the solution containing neutral sulfate or its mixtures with chlorate or mixtures with chlorate and sesquisulfate is processed in a plurality of unit cells, with each unit cell being separated from the adjacent ones by bipolar membranes. The bipolar membranes have an anionic face in the base compartment of one cell and a cationic face in the acid compartment of an adjacent cell. The individual cells are divided by at least one cation-exchange membrane. If a complete conversion of sodium sulfate to sulfuric acid and sodium hydroxide is required, then a plurality of three-compartment unit cells is employed with sodium sulfate being fed to the center compartment which is separated from the base and acid compartments by cation- and anion-exchange membranes, respectively. Using a neutral saltcake resulting from the metathesis process of the invention in such acidification processes is advantageous not only because it improves the current efficiency due to the increased [Na$^+$]/[H$^+$] ratio (as disclosed in the aforementioned copending application), but also because it gives an opportunity to minimize the hardness content in the saltcake used in the acidification process. Minimization of the hardness has a beneficial effect on the cell performance (i.e. current efficiency) and, in addition, it prolongs the life of the membranes used in the acidification process (both cation-exchange and bipolar). The removal of hardness from sesquisulfate or acid sulfate is a complex and costly process which typically requires an initial neutralization of the saltcake with caustic. By employing metathesis in accordance with the present invention one can not only recover the acid values from the saltcake but also minimize the cost involved in adding sodium hydroxide to sesquisulfate (acid sulfate) in order to precipitate ions responsible for the hardness (Ca$^{2+}$, Mg$^{2+}$, Fe$^{2+}$, Fe$^{3+}$ etc.)

GENERAL DESCRIPTION OF INVENTION

Figure 1:
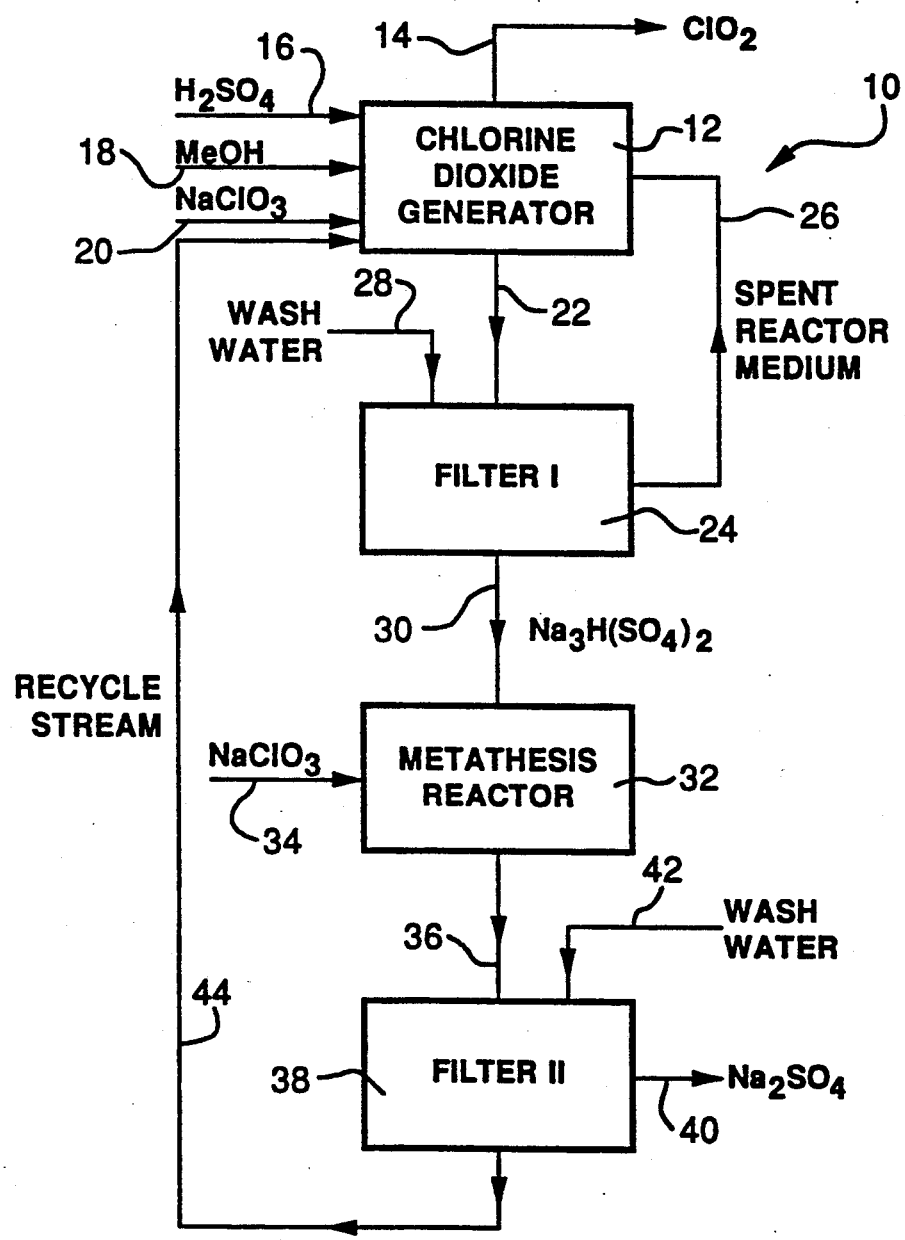
FIG. 1 is a schematic flow sheet of a chlorine dioxide generating process incorporating one embodiment of the present invention.

The sodium sesquisulfate, or other acid sulfate, which is metathesized in accordance with the invention is recovered in crystalline form from a methanol-based chlorine dioxide generating operation. The methanol-based chlorine dioxide generating operation is generally one in which sodium chlorate is reacted with methanol in an aqueous acid reaction medium comprising sulfuric acid and having an acid normality of at least about 4.5 normal, generally from about 5 to about 11 normal, which is maintained at its boiling point under a subatmospheric pressure.

The crystalline sodium sesquisulfate is removed from the reaction zone as a slurry in spent reaction medium and usually is filtered to remove entrained reaction medium, which is returned to the reaction zone. The crystalline sodium sesquisulfate then is contacted with an aqueous medium, in one embodiment containing sodium chlorate in a concentration of about 0.01 to about 7 molar, preferably about 2 to about 4 molar. As noted above, aqueous sodium chloride solution may be employed in place of the sodium chlorate.

The contact of the sodium sesquisulfate by the aqueous medium in this and the other embodiments of the invention is effected at a temperature of at least about 30° C., preferably about 40° to about 70° C., to ensure the production of neutral anhydrous sodium sulfate, which is much more easily handled than the hydrated form. The contact of the aqueous medium with the crystalline sodium sesquisulfate may be effected in any desired manner which achieves efficient liquid-solid contact, such as by stirring in a tank or passing countercurrently through a column.

The aqueous medium containing sodium chlorate preferably contains about 2 to about 4 molar sodium chlorate. This range is preferred over the lower about 0.01 up to about 2 molar range, since the common ion effect of the sodium ions in suppressing neutral anhydrous sodium sulfate solubility is maximized while the range is preferred over the higher range from about 4 molar to about 7 molar, since losses of valuable sodium chlorate with the solid neutral anhydrous sodium sulfate are minimized.

An aqueous sodium chlorate solution brought into contact with the sodium sesquisulfate, which may be a diluted portion of the sodium chlorate feed to the chlorine dioxide generator, generally is neutral. As the metathesis conversion of the sodium sesquisulfate to neutral sodium sulfate occurs, acid is released into the aqueous medium and forms an acid medium containing sulfuric acid which has a total acid normality of up to about 4.8 normal.

The acid aqueous medium which results from the metathesis step is intended to be recycled to the chlorine dioxide generator, so as to employ both the chlorate ion values and recovered acid values contained therein. However, it is also desirable to minimize both the amount of water returned to the generator, since this water must be evaporated in the generator to retain steady state conditions, and the amount of dissolved neutral sodium sulfate returned to the generator, since such recycled material must be recrystallized and refiltered. Accordingly, the weight ratio of water in the aqueous medium contacting the sodium sesquisulfate in this and the other embodiments of the invention generally varies from about 0.5:1 to about 1.4:1, preferably about 0.6:1 to about 0.8:1. Correspondingly, the weight ratio of sodium chlorate to sodium sesquisulfate generally varies from about 0.001:1 to about 1.5:1, preferably about 0.2:1 to about 0.6:1.

If the chlorate value of the acid aqueous medium which results from the metathesis step is low enough, the acid aqueous medium may be employed for other pulp mill purposes, such as tall oil acidification or lime mud neutralization.

In another embodiment of the invention, the crystalline sodium sesquisulfate may be treated with an aqueous medium and a small quantity of methanol, generally up to a weight ratio of about 0.15:1 of methanol per unit weight of sodium sesquisulfate. At these concentrations, the solubility of neutral anhydrous sodium sulfate is suppressed, but there is no necessity to effect stripping of any excess methanol, as is necessary in the aforementioned U.S. Pat. No. 4,325,934 where the preferred weight ratio of methanol to sodium sesquisulfate is indicated to be from 0.3 to 0.8:1. The methanol which remains in the aqueous phase after removal of solid phase neutral sodium sulfate can be used in the chlorine dioxide generator as the sole feed of methanol thereto or to supplement a methanol feed.

Methanol generally is employed in this embodiment of the invention only when sodium chlorate initially is absent from the aqueous contact medium or when concentrations of sodium chlorate towards the low end of the range recited above are present in the aqueous medium, since in the preferred chlorate concentration range, very fine crystals of anhydrous neutral sodium sulfate are formed which are very difficult to separate out and some sodium chlorate is coprecipitated.

The methanol employed in this embodiment of the invention may be provided, in part, by condensate (which may also contain formic acid) from the condenser used to condense steam from the chlorine dioxide product stream prior to dissolution of the chlorine dioxide in water to form an aqueous solution of chlorine dioxide for use in pulp mill bleaching. Inevitably in a methanol-based chlorine dioxide generating process of the type under consideration, some of the methanol reactant is flashed off from the reaction medium and is present in the condensate. By employing a portion of the condensate in the metathesis step, the methanol present in this condensate replaces methanol which otherwise would need to be purchased for use in the metathesis operation.

In a third embodiment, water alone is used as the metathesis medium. In this embodiment, it is necessary to recycle a portion of the product acid medium for use as wash water to free the sodium sesquisulfate of entrained reaction medium, so as to minimize the additional evaporative load imposed on the chlorine dioxide generator by the water used in the metathesis step, when the latter is recycled to the chlorine dioxide generator.

The invention also includes an embodiment of equipment useful for carrying out the combined chlorine dioxide generating process and metathesis step. Accordingly, in a further aspect of the invention, there is provided apparatus for the generation of chlorine dioxide, comprising chlorine dioxide generator means for housing an aqueous acid reaction medium capable of generating chlorine dioxide and of precipitating sodium sesquisulfate therefrom in the generator means, means for removing the precipitated sodium sesquisulfate from the generator means and for conveying same to first solid-liquid filter means, first wash water applying means operatively associated with the first solid-liquid filter means for applying wash water to the sodium sesquisulfate on the filter to assist in freeing the same from entrained aqueous acid reaction medium, first mixing tank means connected in fluid flow relationship with the first solid-liquid filter means for receiving sodium sesquisulfate from the first solid-liquid filter means, metathesis liquid applying means for applying an aqueous metathesis liquid to the sodium sesquisulfate in the first mixing tank means to convert the same to solid neutral anhydrous sodium sulfate, second solid-liquid filter means for separating solid neutral sodium sulfate from spent metathesis liquid, first conduit means for recycling a portion of filtrate from the second solid-liquid filter means to the first solid-liquid filter means, and second conduit means for recycling the remainder of filtrate from the second solid-liquid filter means to the chlorine dioxide generator means.

DESCRIPTION OF PREFERRED EMBODIMENTS

Referring first to FIG. 1, there is illustrated therein one embodiment of a chlorine dioxide generating unit 10 in accordance with the invention. As seen therein, a chlorine dioxide generator 12 produces chlorine dioxide, removed in gaseous admixture with steam via line 14. Feeds of sulfuric acid by line 16, methanol by line 18 and aqueous sodium chlorate solution by line 20 are made to the generator 12 to provide an aqueous acidic chlorine dioxide-generating reaction medium therein which is maintained at its boiling point under a subatmospheric pressure applied thereto.

Crystalline sodium sesquisulfate is precipitated from the reaction medium and is removed in slurry form by line 22 to a first filter 24 wherein the crystalline material is separated from spent reaction medium, which is recycled by line 26 to the chlorine dioxide generator 12. Wash water to assist in separating the crystalline material from entrained reaction medium may be fed to the filter by line 28.

The washed crystalline sodium sesquisulfate is forwarded from the filter 24 by line 30 to a metathesis reactor 32, which preferably takes the form of one or more stirred tanks. To the metathesis reactor 32 is fed an aqueous sodium chlorate solution by line 34 of sufficient concentration and temperature to effect metathesis conversion of the crystalline sodium sesquisulfate to crystalline anhydrous neutral sodium sulfate, with release of acid into the sodium chlorate solution. The resulting slurry is forwarded by line 36 to a second filter 38 for separation of the solid phase sodium sulfate, which is recovered as a product by line 40.

Wash water may be fed by line 42 to the filter 38 to assist in freeing the solid phase from entrained sodium chlorate-containing liquid. The filtrate, containing sodium chlorate, sulfuric acid and dissolved sodium sulfate is recycled by line 44 to the chlorine dioxide generator 12. If desired, a portion of stream 44 may be recycled and used as at least part of the wash water feed in line 28 to the filter 24, to minimize the additional volume of water fed to the generator 12.

The sodium sulfate present in the recycle stream in line 44 is a deadload and cycles within the system, so that, under steady state conditions, the quantity of neutral anhydrous sodium sulfate removed in the product stream in line 40 is equivalent to the quantity of sodium sesquisulfate produced in the generator 12 at any given time.

The sodium chlorate and sulfuric acid present in the recycle stream provide a portion of the feed requirements of the chlorine dioxide generator 12 and the amounts of such chemicals fed by lines 20 and 16 respectively may be decreased accordingly.

Figure 2:
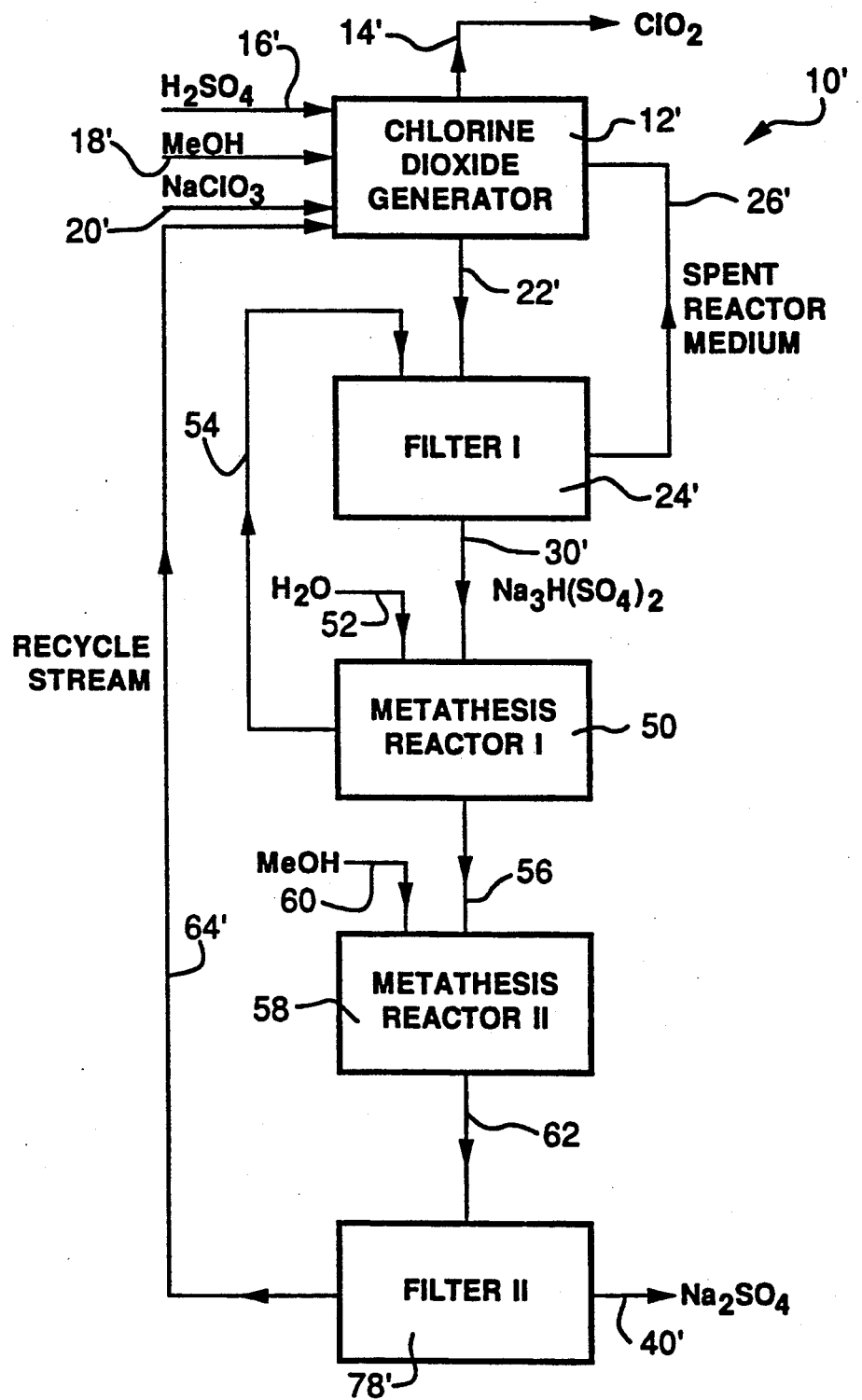
FIG. 2 is a schematic flow sheet of a chlorine dioxide generating process incorporating a second embodiment of the invention.

Referring now to FIG. 2, there is illustrated thereon a second embodiment of a chlorine dioxide generating unit 10' in accordance with the invention. Elements of the arrangement which are in common with FIG. 1 have been designated by the same numerals primed.

The solid crystalline sodium sesquisulfate is forwarded by line 30' to a first metathesis reactor 50 in which the solid is contacted with water fed by line 52 at a temperature and such volume as to effect metathesis of the sodium sesquisulfate to form neutral anhydrous sodium sulfate. A portion of the liquid phase is recycled by line 54 to form wash water for the filter 24'.

The slurry of the remainder of the liquid phase and neutral sodium sulfate crystals is forwarded by line 56 to a second metathesis reactor 58 to which methanol is fed by line 60. The methanol causes further neutral anhydrous sodium sulfate to come out of solution. The resulting slurry is forwarded by line 62 to the filter 38' wherein product neutral anhydrous sodium sulfate is removed by line 40'.

The liquid filtrate contains sulfuric acid recovered from the sodium acid sulfate and the methanol fed by line 60. This aqueous stream is recycled by line 64 to the chlorine dioxide generator 12' to provide at least part of the methanol feed thereto and part of the acid feed thereto, with the quantities of reactants fed by lines 18' and 16' respectively being correspondingly decreased.

Figure 3:
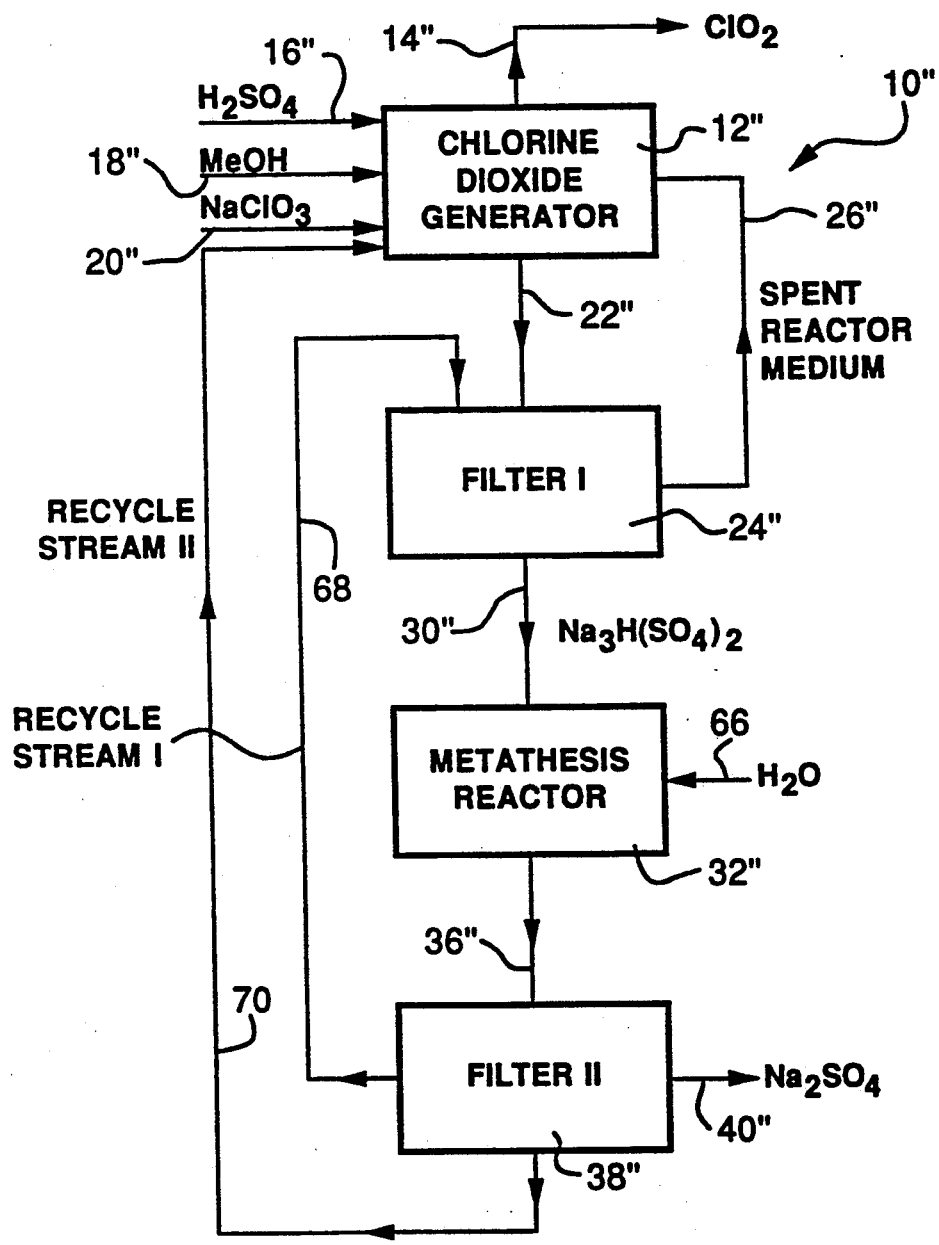
FIG. 3 is a schematic flow sheet of a chlorine dioxide generating process incorporating a third embodiment of the invention.

FIG. 3 illustrates a third embodiment of a chlorine dioxide generating unit 10" in accordance with the invention. Elements of the arrangement which are in common with FIG. 1 have been designated by the same numerals double primed.

In the metathesis reactor 32", the solid crystalline sodium sesquisulfate forwarded by line 30" is contacted with water in line 66 to effect metathesis of the sodium sesquisulfate to form neutral anhydrous sodium sulfate.

The resulting slurry is forwarded by line 36" to the second filter 38" wherein the crystalline anhydrous neutral sodium sulfate is separated and recovered as the product in line 40". Part of the filtrate from the second filter 38" is recycled by line 68 to the first filter 24", so as to provide the wash water employed therein to free the sodium sesquisulfate from spent reaction medium.

The acidic filtrate not recycled by line 68 is recycled by line 70 to the chlorine dioxide generator 12" to provide acid values thereto. By splitting the filtrate from the second filter 38" into two recycle streams in this way, metathesis of sodium sesquisulfate using water alone can be effected without unduly increasing the evaporative load on the chlorine dioxide generator.

The acid filtrate which is recovered from the second filter 38", which is substantially free from sodium chlorate, may be employed for other pulp mill purposes, rather than being recycled by lines 68 and 70 to the filter 24" and generator 12" respectively. For example, the acid filtrate may be used in tall oil acidification or in lime mud neutralization.

EXAMPLES

Example I

This Example illustrates the effect of sodium chlorate concentration and sodium sesquisulfate loading on metathesis conversion.

A series of experiments was carried out wherein 300 mls of sodium chlorate solution was brought to a temperature of about 70° C. and a known quantity of dried sodium sesquisulfate was added. The mixture was maintained at 70° C., under agitation, for about 15 minutes. The mixture then was filtered and the resultant solids washed with about 15 ml of warm water. The solids and pre-rinse filtrate were analyzed for various parameters.

The results of representative experiments are set forth in the following Tables I and II, which show respectively, the effect of varying the sodium chlorate concentration on a fixed amount of sodium sesquisulfate and the effect of varying the sodium sesquisulfate concentration on a fixed amount of sodium chlorate:

TABLE I

EFFECT OF $NaClO_3$ CONCENTRATION

| $NaClO_3$ Conc. (N) | $Na_3H(SO_4)_2$ Added (g) | Solids Yield (g) | Solids Acidity (wt % $H_2SO_4$) | Filtrate Acidity (N) | $NaClO_3$ Residue (wt %) |
|---|---|---|---|---|---|
| 3.5 | 157 | 32.6 | 0.0 | 1.85 | 1.42 |
| 4.0 | 157 | 28.8 | 0.0 | 1.61 | 1.30 |
| 5.0 | 157 | 52.3 | 1.29 | 1.52 | 7.41 |
| 6.0 | 157 | 75.3 | 0.0 | 1.76 | N/A |

TABLE II

EFFECT OF $Na_3H(SO_4)_2$ LOADING OF $NaClO_3$ SOLUTION

| $NaClO_3$ Conc. (N) | $Na_3H(SO_4)_2$ Added (g) | Solids Yield (g) | Solids Acidity (wt % $H_2SO_4$) | Filtrate Acidity (N) | $NaClO_3$ Residue (wt %) |
|---|---|---|---|---|---|
| 3.0 | 314 | 178.8 | 0.0 | 2.96 | 3.68 |
| 3.0 | 471 | 182.4 | 0.0 | 4.25 | 0.62 |

TABLE II-continued

EFFECT OF Na₃H(SO₄)₂ LOADING OF NaClO₃ SOLUTION

| NaClO₃ Conc. (N) | Na₃H(SO₄)₂ Added (g) | Solids Yield (g) | Solids Acidity (wt % H₂SO₄) | Filtrate Acidity (N) | NaClO₃ Residue (wt %) |
|---|---|---|---|---|---|
| 3.0 | 498 | 209.5 | 0.0 | 4.29 | 0.68 |

All Na₃H(SO₄)₂ used was 17.9 wt % H₂SO₄.

As may be seen from Table I, as the sodium chlorate concentration decreased, so did the amount of residual sodium chlorate in the neutral sodium sulfate crystals. In addition, the yield of neutral sodium sulfate solids also was related to the sodium chlorate solution concentration, with the yield decreasing as the solute concentration decreased. In addition, the sodium chlorate solution concentration had no effect on residual acidity in the neutral sodium sulfate product, since, in the majority of cases, residual acidity was zero % irrespective of the sodium chlorate solution concentration.

As may be seen from Table II, for a fixed sodium chlorate solution concentration and volume, if the amount of sodium sesquisulfate added is increased, then the yield of neutral sodium sulfate increases along with the acidity of the filtrate. As can be seen, acidity values up to 4.29N were obtained with no residual acidity in the neutral sodium sulfate.

Example II

This Example illustrates the effect of residence time on metathesis conversion.

Into 600 mls of water at 80° C., 1076 g of Na₃H(SO₄)₂ was added and the temperature adjusted to about 70° C. The slurry solution was sampled by taking approximately 50 ml aliquots at 2, 4, 6, 8 and finally 12 minutes. Each sample was filtered and the collected solids were rinsed in approximately 10 ml of warm water. The solids and pre-rinse filtrates were analyzed for various parameters.

The results are set forth in the following Table III:

TABLE III

RESIDENCE TIME RESULTS (BATCH RUNS WITH WATER)

| Run # | Sample Time (minutes) | Filtrate Acidity (N) | Solids Acidity (wt % H₂SO₄) |
|---|---|---|---|
| 1 | 2.0 | 4.00 | 4.03 (Not rinsed) |
|   | 4.0 | 4.00 | 0.61 |
|   | 6.0 | 4.04 | 2.39 |
|   | 8.0 | 4.08 | 1.22 |
| 2 | 2.0 | 3.88 | 0.0 |
|   | 4.0 | / | 0.0 |
|   | 6.5 | 3.88 | 0.0 |
|   | 8.5 | 3.92 | 0.0 |
|   | 12.0 | / | 0.0 |

NOTE: Run # 2 had better washing of filtered solid.

As may be seen from the results of Table III, the metathesis reaction was relatively fast, with a full filtrate acidity of approximately 4N being achieved from 2 minutes onwards, indicating that all the conversion to neutral sodium sulfate had been completed. Some inconsistencies can be seen in the residual acidities but these were found to be the result of incomplete washing of the crystals.

Example III

This Example illustrates the effect of addition of methanol in the metathesis process.

Three different experiments were conducted, as follows:

(a) 300 ml of 3M sodium chlorate was heated to about 70° C. and 498 g of dry sodium sesquisulfate was added and the mixture was stirred at about 70° C. for about 15 minutes. The solution was filtered and the solids washed. 25 ml of 99.8% methanol was added to the pre-wash filtrate and the resultant precipitate was analyzed for chlorate.

(b) 600 ml of water at about 70° C. and 1076 g of sodium sesquisulfate (8% H₂O) were combined and mixed at about 70° C. for about 15 minutes. The prewash filtrate was added to a volume of methanol approximately three times its volume. The resultant precipitate was filtered and analyzed for acidity (without rinsing).

(c) Experiment (b) was repeated with 53.4 ml of 99.8% methanol added to the pre-filtrate; under mild agitation. The resultant precipitate was filtered (not washed) and analyzed for acidity.

The results of the three Experiments are set forth in the following Table IV:

TABLE IV

EFFECT OF METHANOL ON YIELD

| Na₃H(SO₄)₂ Added | NaClO₃ Conc. | Filtrate Vol. | CH₃OH Added | Yield Orig/Final | Resid. NaClO₃ | % Yield Incr. |
|---|---|---|---|---|---|---|
| 498 g | 3.0 M | 380 ml | 25 ml | 209 g/263 g | 7.9 w/w | +13.1 |
| 996 g | 0.0 M | 780 ml | 1.5 L | 200 g/460 g | 0.0 | +24.3 |
| 996 g | 0.0 M | 780 ml | 53.4 ml | 276 g/328 g | 0.0 | +5.9 |

NOTE: Based upon approx. 17.5 wt % H₂SO4 in sodium sesquisulfate, the maximum yield for the added amounts is
i) 498 g → 410.8 g Na₂SO₄
ii) 996 g → 821.7 g Na₂SO₄

As may be seen from the results of Table IV, the use of 3M NaClO₃ resulted in a precipitate containing a considerable concentration of sodium chlorate, forced out of solution along with the sodium sulfate. In addition, the neutral sodium sulfate crystals were very fine and took approximately one hour to settle.

The use of 50 ml of methanol (89 ml/L of filtrate) resulted in an additional approximately 6% yield over water use only. (i.e. 31.25 to 37.15%). The use of a large volume of methanol almost doubled the yield but resulted in a filtrate solution with a high methanol concentration, which would require separation.

Example IV

This Example illustrates the effect of the various metathesis schemes illustrated in FIGS. I to 3 on the evaporative load of the chlorine dioxide generator.

Based on the data presented in the above Examples, mass balances were prepared for the three embodiments of metathesis shown in FIGS. 1 to 3 These mass balances are set forth in the following Table V:

TABLE V

|  | FIG. 1 | FIG. 2 | FIG. 3 |
|---|---|---|---|
| Filter Feed (sesqui) | 2766 Kg (22) | 2905 Kg (22') | 4288 Kg (22") |
| Wash Water-Filter I | 1100 Kg (28) | (none)[3] | (none)[4] |
| Solid Phase | 2766 Kg Na$_3$H(SO$_4$)$_2$ (30) | 2905 Na$_3$H(SO$_4$)$_2$ (30') | 4288 Kg Na$_3$H(SO$_4$) (30") |
| Metathesis Feed | 1755 L of 3M NaClO$_3$ (34) (1540 Kg H$_2$O, 561 Kg NaClO$_3$) | 1744 Kg H$_2$O (52) 150 Kg CH$_3$OH (60) | 2573 Kg H$_2$O (66) |
| Wash water | 444 Kg (42) | (none) | (none) |
| Product (Na$_2$SO$_4$) | 1121 Kg (40) | 1100 Kg (40') | 1100 Kg (40") |
| Recycle to generator | 1984 Kg H$_2$O (44) 561 Kg NaClO$_3$ 469 Kg H$_2$SO$_4$ 1170 Kg Na$_2$SO$_4$ | 1247 Kg H$_2$O (64) 169 Kg H$_2$SO$_4$ 779 Kg Na$_2$SO$_4$ 150 Kg CH$_3$OH | 3805 Kg (5) |
| Recycle to Filter I | (none)[1] | 497 Kg H$_2$O 503 Kg Na$_2$SO$_4$ (606 sesqui) 325 Kg H$_2$SO$_4$ (222 free) | 1956 Kg[5] |
| Increased Evaporative Load | 1.78 t/tClO$_2$[2] | 1.2 t/tClO$_2$[2] | 2.03 t/t ClO$_2$[2] |

Notes:
[1] If a portion of recycle stream is recycled and replaces the wash water feed in line 28, the increased evaporative load drops to 0.68 t/t ClO$_2$.
[2] Normal evaporative load is approximately 4 t/t ClO$_2$ with design of 5 to 6 to allow for catch-up.
[3] 1325 Kg of wash water is provided by recycle stream (54).
[4] 1956 Kg of wash water is provided by recycle stream (68).
[5] Each of these streams comprised 37.5 wt % H$_2$O, 38.0 wt % Na$_2$SO$_4$ and 24.5 wt % H$_2$SO$_4$.

As may be seen from this Table, metathesis using water increased the evaporative load by approximately 2 tonnes/tonne of chlorine dioxide generated, well below the increased load imposed by the prior art metathesis processes using water alone and within the range of current design loads. This result is important since it is unnecessary to provide a higher capacity reboiler or condenser than in the existing equipment, which would not be the case, if the evaporative load is increased by 3 to 4 t/t ClO$_2$. Using aqueous sodium chlorate solution decreases the evaporative load to around 1.78 t/t ClO$_2$, which value can be further decreased to 0.68 t/t ClO$_2$ by effecting recycle. Methanol and water metathesis provided an acceptable increased evaporative load of 1.2 t/t ClO$_2$ without the necessity to use methanol in an excess quantity that requires evaporative stripping prior to recycle.

Example V

This Example illustrates the effect of addition of sodium chloride concentration on metathesis conversion.

A series of experiments was carried out wherein 500 g of dried sodium sesquisulfate was added to 300 ml of water. Sodium chloride in varying quantities was added and the solution held and mixed at 70° C. for 5 minutes. The mixture then was filtered and the resultant solids washed with about 50 ml of warm water.

The results obtained are set forth in Table VI below:

TABLE VI

| Mol/L NaCl Added | Total Yield Na$_2$SO$_4$ | Total NaCl Precip. | Wt % NaCl in Solids |
|---|---|---|---|
| 0 | 209 g | — | — |
| 2 | 219.8 g | 0.26 g | 0.12 |
| 3 | 236.9 g | 0.97 g | 0.41 |
| 4 | 242 g | 1.06 g | 0.44 |
| 5 | 244 g | 4.68 g | 1.92 |

As may be seen from this data, an increased yield of neutral anhydrous sodium sulfate is obtained in the presence of added sodium chloride and the yield generally increased with increasing concentrations of sodium chloride. Significant contamination of product by sodium chloride was only experienced at high sodium chloride concentrations.

SUMMARY OF INVENTION

In summary of this disclosure, the present invention provides a novel procedure for achieving metathesis of sodium sesquisulfate using sodium chlorate to form neutral anhydrous sodium sulfate. Modifications are possible within the scope of this invention.

What is claimed is:

1. Apparatus for the generation of chlorine dioxide, comprising:
   chlorine dioxide generator means for housing an aqueous acid reaction medium capable of generating chlorine dioxide and of precipitating sodium sesquisulfate therefrom in said generator means,
   means for removing the precipitated sodium sesquisulfate from said generator means and for conveying the removed sodium sesquisulfate to first solid-liquid filter means,
   first wash water applying means operatively associated with said first solid-liquid filter means for applying wash water to the sodium sesquisulfate on the filter to assist in freeing the sodium sesquisulfate from entrained aqueous acid reaction medium,
   first mixing tank means connected in fluid flow relationship with said first solid-liquid filter means for receiving sodium sesquisulfate from said first solid-liquid filter means,
   metathesis liquid applying means for applying an aqueous metathesis liquid to the sodium sesquisulfate in the first mixing tank means to convert the sodium sesquisulfate to solid neutral anhydrous sodium sulfate,
   second solid-liquid filter means connected in fluid flow relationship to said first mixing tank means for separating solid neutral sodium sulfate from spent metathesis liquid,
   first conduit means for recycling a portion of filtrate from said second solid-liquid filter means to said first solid-liquid filter means, and
   second conduit means for recycling the remainder of filtrate from said second solid-liquid filter means to said chlorine dioxide generator means.

* * * * *